Oct. 11, 1932.    G. C. HARTLEY    1,881,544
TESTING DEVICE FOR TELEPHONE EXCHANGE SYSTEMS
Filed July 8, 1931    4 Sheets-Sheet 1

INVENTOR
G. C. HARTLEY
BY
P. C. Smith
ATTORNEY

INVENTOR
G.C. HARTLEY
BY
P.C. Smith
ATTORNEY

Oct. 11, 1932. G. C. HARTLEY 1,881,544
TESTING DEVICE FOR TELEPHONE EXCHANGE SYSTEMS
Filed July 8, 1931 4 Sheets-Sheet 4

INVENTOR
G.C. HARTLEY
BY
P. C. Smith
ATTORNEY

Patented Oct. 11, 1932

1,881,544

UNITED STATES PATENT OFFICE

GEORGE CLIFFORD HARTLEY, OF ALDWYCH, LONDON, ENGLAND, ASSIGNOR TO WESTERN ELECTRIC COMPANY, INCORPORATED, OF NEW YORK, N. Y., A CORPORATION OF NEW YORK

TESTING DEVICE FOR TELEPHONE EXCHANGE SYSTEMS

Application filed July 8, 1931, Serial No. 549,338, and in Great Britain October 23, 1930.

This invention relates to a routine test circuit for testing subscribers' line circuits, trunks, or tie lines either in automatic, semi-automatic or manual systems. In the operation of a telephone exchange system it is important to maintain a high standard of operating efficiency in the circuit paths over which subscribers have access to responsive means in the exchange, since unstandard conditions on subscribers' lines would ordinarily cause the isolation of such subscribers. It is therefore the object of this invention to provide automatic means for making tests of subscribers' line circuits periodically whereby any unstandard condition may be detected and remedied to thus maintain such line at all times in efficient working condition.

In accordance with the present invention, the testing device comprises a distributing switch for successively selecting final selectors which have access to the lines to be tested, a sequence switch for successively applying the required tests to each line selected for testing, and a line indicating switch which is advanced each time a new line is seized for test and which causes through banks of lamps the number of the particular line under test to be displayed. The sequence switch is arranged to advance step by step to successively apply the prescribed tests to the particular line under test unless a test failure or unstandard condition for a particular test is encountered in which event an alarm is operated to indicate a test failure. Following the successful test of a line the test circuit causes the final selector which is at the time associated with the testing device to be advanced to the next line in its bank. When all lines accessible from a particular final selector have been tested, the distributing switch is advanced to select another final selector and tests are then made on all lines to which such final selector has access.

The advance of the sequence switch for making a series of prescribed tests of a line under test is automatic from position to position, eighteen test positions being provided as follows:

1. Test for busy condition of the line to be tested.
2. Test for dead number.
3. Test of line relay feed.
4. Test of idle condition on sleeve conductor of line.
5. Test to determine if the line relay is disconnected.
6 and 7. Line insulation test of negative line conductor to ground.
8 and 9. Line insulation test for negative line conductor to positive line conductor.
10. Discharge of potential from substation ringer condenser so as not to interfere with the next test.
11 and 12. Line insulation test of positive line conductor to ground.
13. Discharge of potential from substation ringer condenser so as not to interfere with the next test.
14. Test to determine if the ringer condenser has been discharged.
15. Completion of ringer condenser discharge.
16. Release of cut-off relay.
17. Line finder of first bye-path operated to find line and is released.
18. Sequence switch is returned to normal and the final selector is advanced in synchronism with the line number indicating switch.

To provide for the automaic advance of the sequence switch in positions 8 to 12 inclusive for making line insulation tests, a thermionic valve relay is provided which operates to open the magnet circut of the sequence switch only if the line insulation is found to be in unstandard condition.

For a clearer understanding of the invention reference may be had to the accompanying drawing taken in connection with the following detailed description. In the drawings:

Figs. 1 and 2 taken together disclose the testing device, Fig. 1 showing the test sequence switch and associated testing circuits and Fig. 2 showing at the right thereof the distributor switch for successively selecting final selectors and at the left the line number indicating switch;

Fig. 5 is a diagram showing the manner in which the several sheets of drawings should be arranged to show the complete invention.

Figure 1:
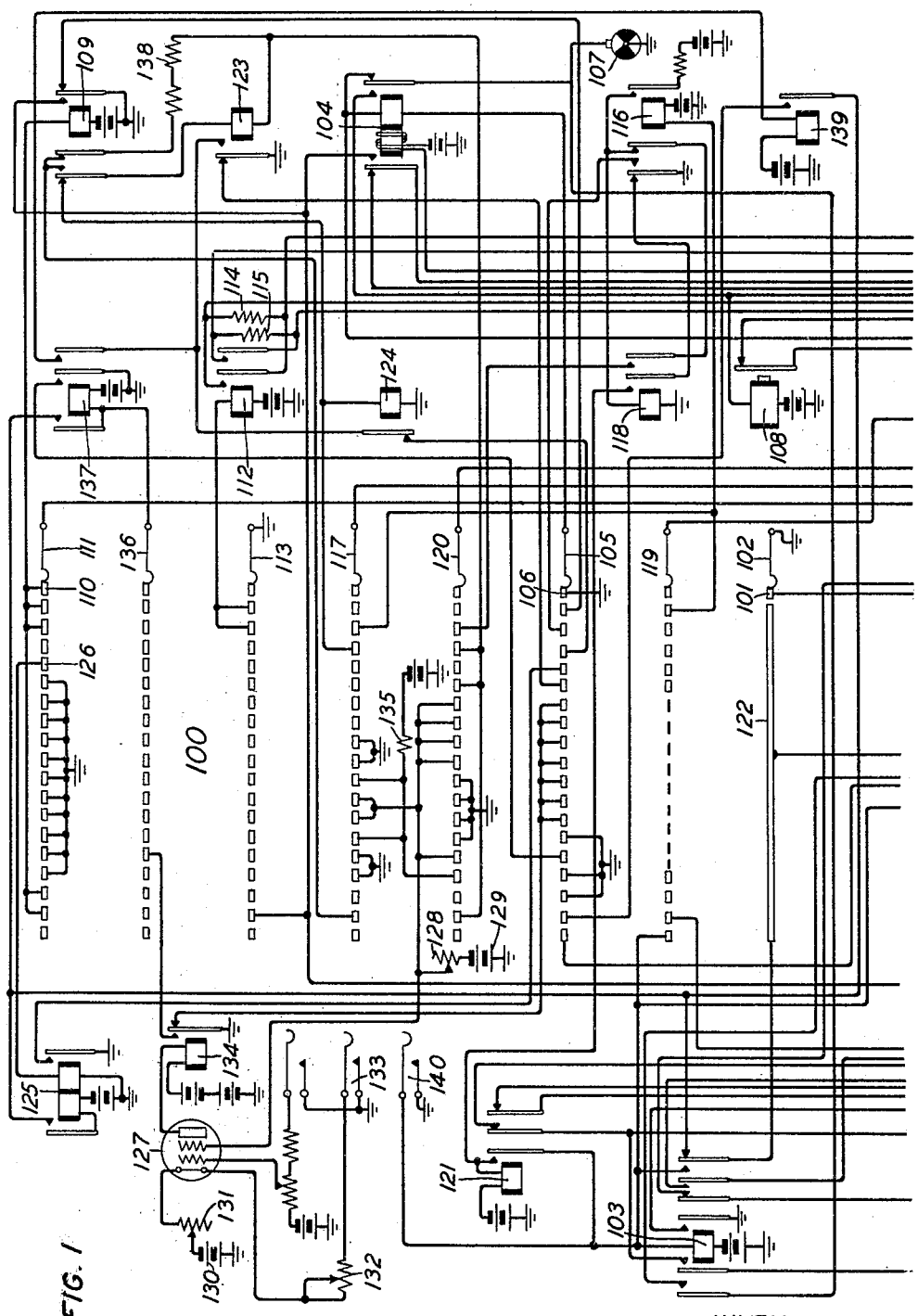
Figure 2:
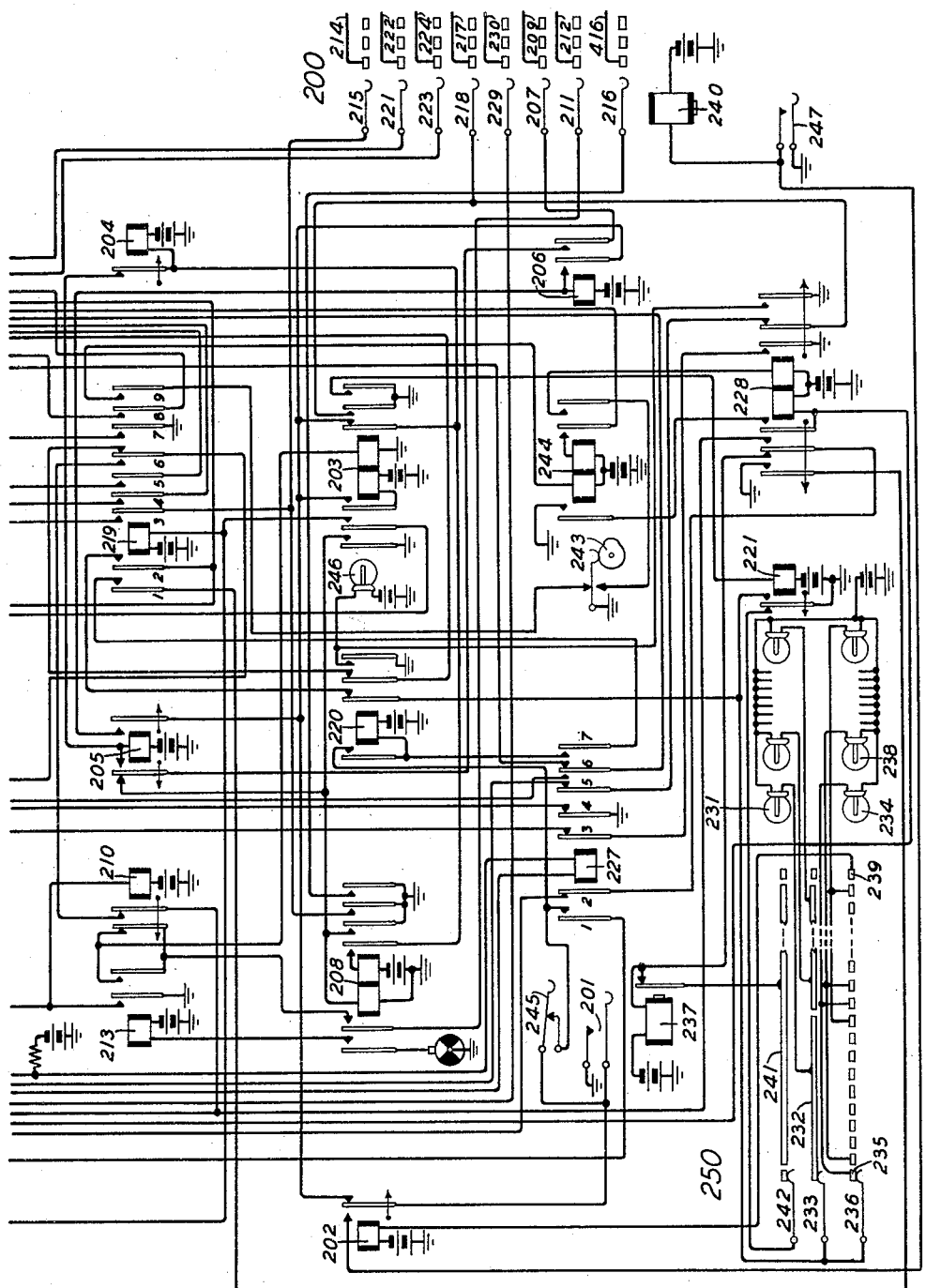

The testing device functions in the following manner, it being assumed that the digits 1, 1 are first sent to the final selector stage for the purpose of initiating tests:

Seizure of line for testing

When the test man operates the start key 201 a circuit is established from ground over the back contacts of relay 202, right back contact of relay 203 to battery through the winding of relay 204, but relay 204 being slow to operate, a circuit is established for relay 205 before relay 204 operates which may be traced from battery, winding of relay 205, back contact of relay 204, thence as traced to ground at key 201. Relay 205 upon operating closes a circuit for relay 206, extending from battery, winding of relay 206, right contact of relay 205, back contact of relay 202 to ground at key 201, relay 206 locking over its inner contact to ground at key 201. As soon as relay 204 operates the operating circuit of relay 205 is opened but a holding circuit therefor is closed over its left front contact and the outer contact of relay 206 to test wiper 207 of the distributing switch 200 and to ground at the final bye-path switch if it is busy.

If the final bye-path is free, relay 205 releases and a circuit is established from ground through the left winding of relay 208, left back contact of relay 205, outer contact of relay 206, wiper 207 and associated bank terminal, conductor 209, inner left back contact of relay 301, outer left back contact of relay 302, conductor 303, inner left back contact of relay 400, conductor 401, normal terminal and wiper 304 of switch 330, next to outer right back contact of relay 402, middle left back contact of relay 403, wiper 305 and associated normal terminal, inner right back contact of relay 400, resistance 404 to battery. Relay 208 operates in this circuit and locks from battery through its right winding and inner right contact, right back contact of relay 203, back contact of relay 202 to ground at the key 201, and at its next to inner right contact connects direct ground to the wiper 207 to render the bye-path busy to other calls. Relay 208 also closes a circuit from ground through the right winding of relay 203, outer back contact of relay 210, inner left contact of relay 208, wiper 211, conductor 212 to battery through the impulsing relay 405 of the bye-path. Relay 203 does not operate in this circuit as the resistance of relay 405 is too great but relay 405 operates and closes an obvious circuit for relay 400 which operates and locks over its inner left front contact, conductor 303, thence as traced over wiper 207, to ground at the next to inner right front contact of relay 208. A circuit is now closed for relay 410 extending from battery, right winding of relay 410, inner right back contact of relay 406 to ground at a front contact of relay 400.

At its outer left front contact relay 208 connects interrupted ground through the winding of relay 213 which upon each energization closes an obvious circuit for slow-releasing relay 210. Relay 213 at its outer contact also shunts the outer contact of relay 210 so that when relay 210 operates to open its back contact the circuit previously traced for pulsing relay 405 is maintained. When relay 213 now releases and before relay 210 has time to release the circuit of relay 405 is opened and transmits an impulse through the winding of stepping magnet 306 of switch 330, inner left back contact of relay 406, next to inner right front contact of relay 400, winding of slow-releasing relay 407, back contact of relay 405 to ground at the inner left back contact of relay 403. As soon as relay 210 releases, relay 405 again energizes opening the circuit of magnet 306. Switch 330 is thereby advanced one step closing a circuit extending from battery through the winding and interrupter contacts of magnet 307, wiper 308 and normal terminal of switch 350, outer left front contact of relay 400, wiper 309 and off-normal segment 310, outer left back contact of relay 406, back contact of relay 408 to ground at the right back contact of relay 403. However, before magnet 307 can energize a circuit is established for relay 408 extending from battery through its winding, wiper 311 and No. 1 terminal of the cooperating bank of switch 330 strapped to the normal terminal with which wiper 305 of switch 350 is in engagement, inner right front contact of relay 400, outer right back contact of relay 406 to ground at the outer right front contact of relay 400. Relay 408 upon operating opens the previously traced circuit for magnet 307.

Figure 3:
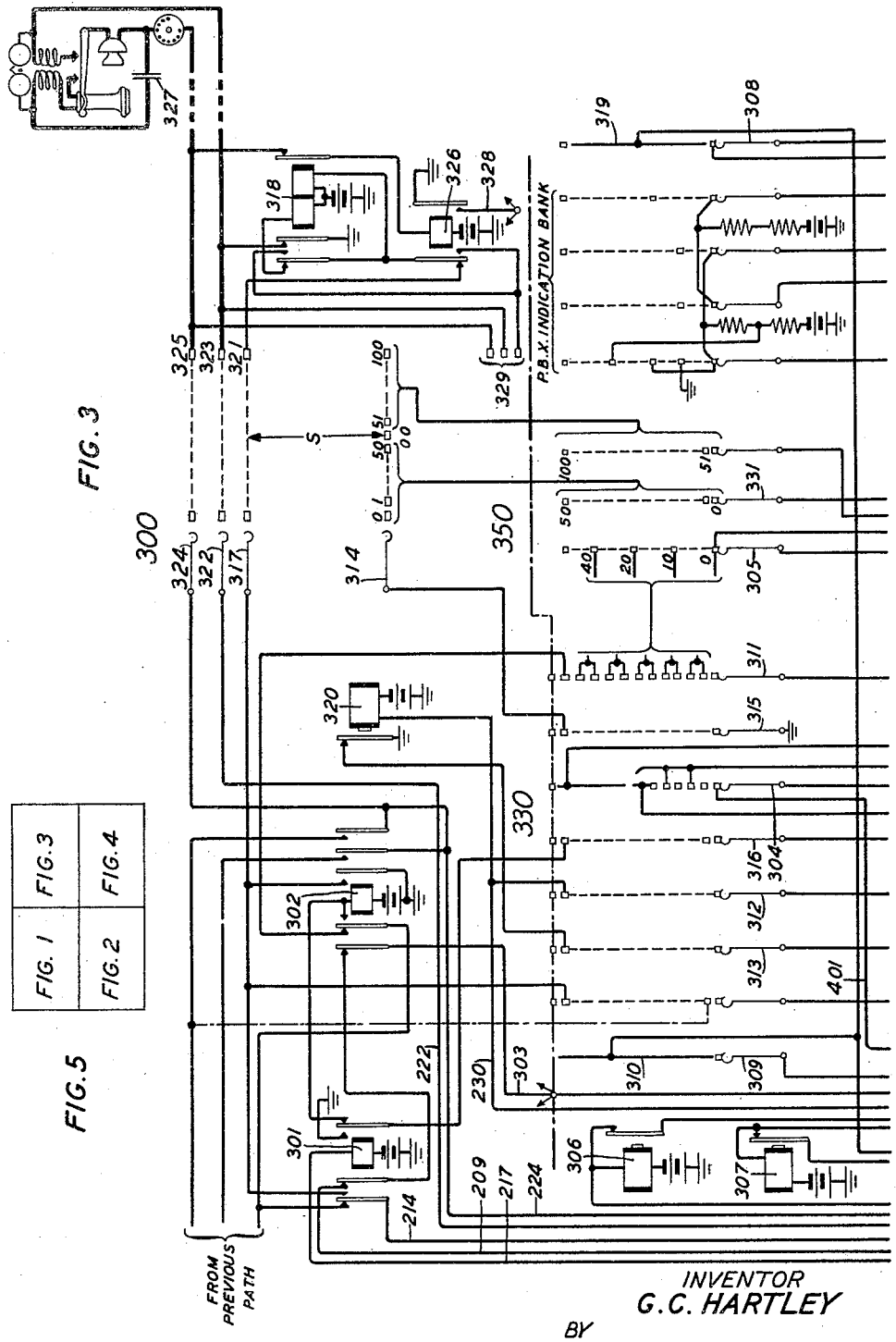
Figs. 3 and 4 show the switches at a final selecting stage, Fig. 3 showing a final selector and one line to which it has access and Fig. 4 showing a bye-path switch which is common to a plurality of final selectors, such as the final selector of Fig. 3.
Figure 4:
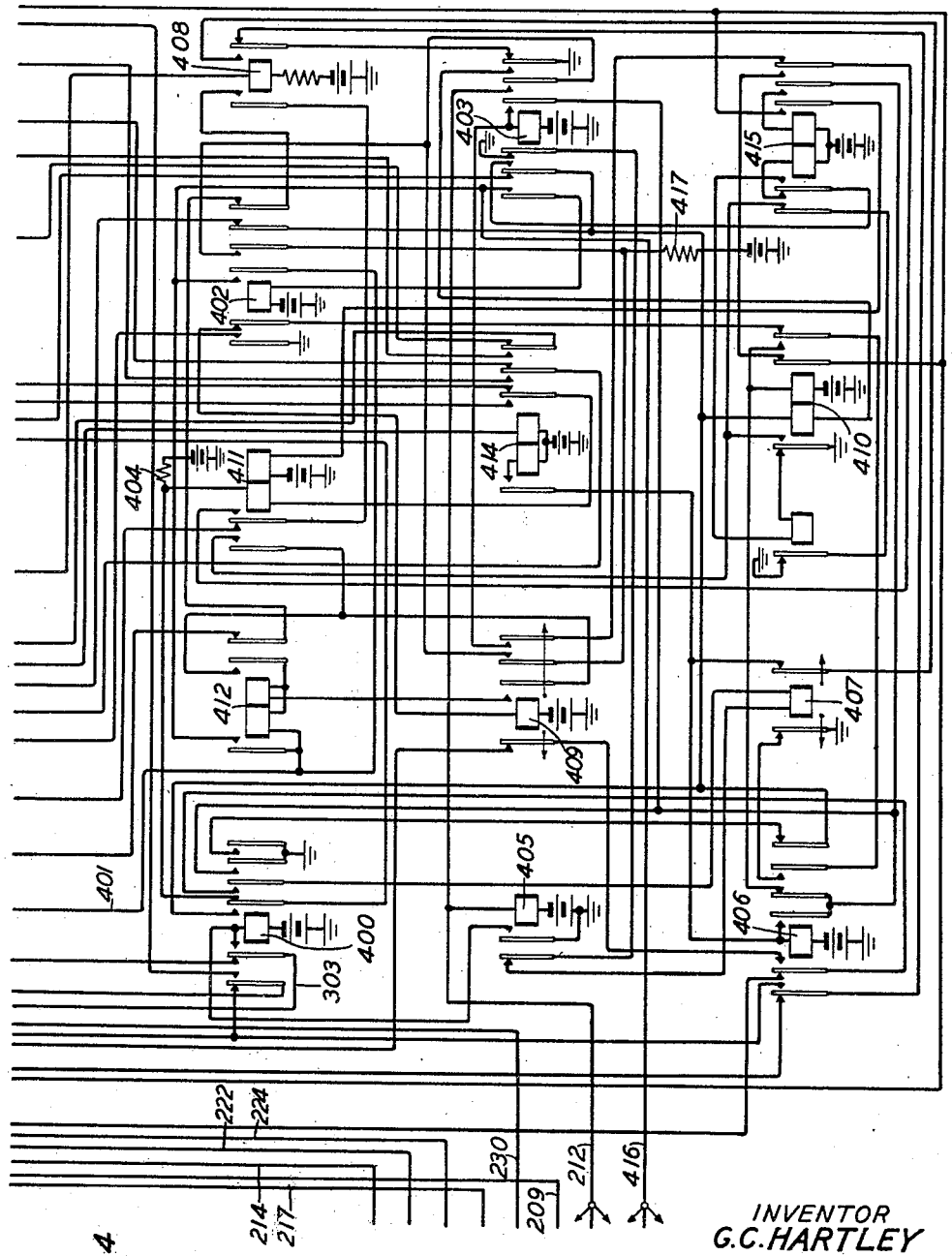

Upon the termination of the impulse when relay 405 reoperated, it opened the circuit of slow-to-release relay 407 which after an interval releases, closing a circuit for operating relay 406 extending from battery, winding of relay 406, right back contact of relay 407, right front contact of relay 408 to ground at the right back contact of relay 403. Relay 406 then locks over its inner right front contact to ground at the next to outer right contact of relay 400 and closes a holding circuit for relay 410 extending from battery, right winding and outer right front contact of relay 410, next to outer right front contact of relay 406 to ground at the left contact of relay 407. When relays 210 and 213 operate to transmit a second impulse relay 405 again deenergizes and since relay 406 is now operated a circuit is established from battery through the winding of magnet 307, left back contact of relay 409, inner left front contact of relay 406, next to inner right front contact of relay 400, winding of relay 407, back contact of relay 405, to ground at the inner left back contact of relay 403. Magnet 307 and relay 407 operate, relay 407 opening the holding circuit of relay 410 which now releases. Magnet 307 advances the wipers of switch 350 one step thereby releasing relay 408 which closes a circuit for magnet 306 extending from battery, winding and interrupter contacts of magnet 306, outer left front contact of relay 406, back contact of relay 408 to ground at the right back contact of relay 403. Magnet 306 now advances its wipers step by step to hunt for an idle final selector. When an idle final selector is found such as the selector of Fig. 3, a circuit is established from battery, winding of relay 408, wiper 311, inner left back contact of relay 302, outer left back contact of relay 301, conductor 214, wiper 215 to ground at a front contact of relay 208. All busy final selectors will have their test circuits corresponding to the circuit just traced open at contacts of their relays corresponding to relay 302.

Relay 408 upon operating opens the stepping circuit of magnet 306 and completes a circuit for magnet 320 of the selected final selector 300 from battery, winding of magnet 320, wiper 312 of switch 330, left back contact of relay 411, left contact of relay 408, outer right back contact of relay 402, right back contact of relay 412, wiper 313, to ground at the interrupter contacts of magnet 320. Under the control of magnet 320 the final selector hunts for the line marked by the switch 350. When this line is found relay 411 operates in a circuit extending from battery, left winding of relay 411, inner right back contact of relay 414, wiper 331 of switch 350, marked terminal upon which wiper 331 has been positioned strapped to the marking multiple of switch 300 to which wiper 314 has access, wiper 314, terminal of switch 330 to ground on wiper 315. Relay 411 operates opening the previously traced circuit of magnet 320 to arrest the wipers of switch 300 on the terminal of the marked line in its bank. It will be noted that relay 411 will operate regardless of the busy or idle condition of the selected line.

In the meantime following the release of relay 407 upon the termination of the last impulse, relay 409 will have operated in a circuit extending from battery, winding of relay 409, left back contact of relay 402, outer right back contact of relay 410, next to outer right front contact of relay 406, to ground at the left back contact of relay 407. Hence, when relay 411 operates as above described a circuit is established for relay 403 extending from battery through the winding of relay 403, outer right front contact of relay 409, right back contact of relay 415, inner left front contact of relay 411, left front contact of relay 408, outer right back contact of relay 402, right back contact of relay 412, wiper 313 of switch 330 to ground at the interrupter contacts of magnet 320. Relay 403 upon operating locks over its inner right front contact to ground at a front contact of relay 400.

Upon the operation of relay 403 a circuit is established from battery, winding of relay 402, outer left front contact of relay 403, conductor 416, wiper 216 to ground at the outer right front contact of relay 208 thereby operating relay 402 which opens the circuit of relay 409. Relay 402 also establishes a circuit for relay 302 of the final selector extending from battery, winding of relay 302, right back contact of relay 301, wiper 316 of switch 330 to ground at the outer left front contact of relay 402. With relay 409 released and relay 403 operated battery is connected in parallel with the winding of relay 405 to the circuit extending over wiper 211 of the distributor switch 200 to the right winding of relay 203, this parallel battery connection extending over the middle right front contact of relay 403, the right back contact of relay 409, resistance 417 to battery. Relay 203 now receives sufficient current to operate and locks over its left winding and inner left front contact, back contact of relay 202 to ground at the start key 201. A circuit is now closed from battery, winding of relay 301 of the final selector, conductor 217, wiper 218 of the distributor switch 200 to ground at the middle right front contact of relay 203. Relay 301 opens the circuit of relay 302 and connects the sleeve wiper 317 of final selector 300 over the left front contact of relay 301, conductor 214, wiper 215 to ground at a front contact of relay 208. Relay 301 upon operating busies the final selector so that it may not be seized for other connections. Relay 203 upon operating also opens the previously traced circuit for relays 208 and 204 thus releasing relay 405 in the bye-path. The operation of relay 301 also opens the locking circuit of relays 400 and 408, relay 400 in turn releasing relays 403 and 406. Relay 403 upon releasing releases relay 402.

Upon the release of relay 400 a restoring circuit is established for switch 330 extending from battery through the winding and interrupter contacts of magnet 306, outer left back contact of relay 400, wiper 309, off-normal segment 310, outer left back contact of relay 406, right back contact of relay 408, to ground at the outer right back contact of relay 403. Magnet 306 advances switch 330 to normal in which position the circuit of relay 411 is opened and relay 411 releases. A restoring circuit is also established for switch 350 extending from battery through the winding and interrupter contacts of magnet 307, wiper 308 and off-normal segment 319 of switch 350, thence to ground as traced at the right back contact of relay 403. All apparatus of the bye-path has now been returned to normal. The testing device having now selected a subscriber's line through the positioning of final selector 300 is in readiness to conduct tests on such line.

When relay 203 operated it closed an obvious circuit for relay 221 and a circuit for operating relay 219 which may be traced from battery, winding of relay 219, middle left front contact of relay 203, normal terminal and wiper 102 of sequence switch 100 to ground. Relay 219 locks over the next to inner right back contact of relay 103, the No. 2 contacts of relay 219, inner right back contact of relay 220 to ground at the front contact of relay 221. Relay 219 closes a circuit from battery, left non-inductive winding of relay 104, No. 8 contacts of relay 219, right operating winding of relay 104 to ground over wiper 105 and normal terminal 106 of switch 100. Interrupted ground is connected from interrupter 107 over the right back contact of relay 104, short circuiting the right operating winding of relay 104 until the interrupter advances to a position to disconnect this ground. As soon as the short circuit is removed from the right winding of relay 104, it operates in the circuit previously traced and connects interrupter 107 over the right front contact of relay 104, to battery through the winding of stepping magnet 108 of switch 100, which advances switch 100 one step under the control of the interrupter.

*Test for idle of busy condition of subscriber's line under test*

If the subscriber's line to which connection has been made is busy relay 109 will have operated over a circuit extending from battery, winding of relay 109, normal terminal 110 and wiper 111, No. 3 contacts of relay 219, wiper 215, conductor 214, left front contact of relay 301, final selector wiper 317 to ground on the test terminal 321. With relay 109 operated, when switch 100 reaches position 1 the initial energizing circuit of relay 104 will be opened, and as the locking circuit therefor extending from battery through its left winding over the No. 8 contacts of relay 219, right winding of relay 104, wiper 105 and No. 1 terminal with which it is in engagement to ground at the back contact of relay 109 is opened, relay 104 releases, holding switch 100 in position 1. A circuit is now established for relay 116 extending from battery, winding of relay 116, No. 1 terminal with which wiper 119 is now in engagement to ground at the No. 7 contacts of relay 219. Relay 116 in turn closes an obvious circuit for relay 118. Switch 100 will remain in this position until the subscriber's line becomes free and relay 109 releases. When relay 109 releases, relay 104 operates over the circuit just traced and again connects interrupter 107 to the winding of stepping magnet 108 thereby advancing switch 100 into position 2.

*Test to determine if the selected line terminals are dead*

In positions 1 and 2 the circuit of relay 112 is closed over wiper 113 to short circuit retard coils 114 and 115 which are normally connected into the positive and negative leads of the testing device. With switch 100 in position 2 a holding circuit is established from battery, winding of relay 116, wiper 117, No. 4 contacts of relay 219, inner right front contact of relay 112, wiper 221, conductor 222, wiper 322 of the final selector to line terminal 323. If relay 116 releases indicating that there is no ground on the terminal on which wiper 322 is resting, and therefore that the line terminal to which the final selector has been advanced may be dead or blank a further test is made to insure that the former test has been accurately made, through the connection of relay 118 over the inner left back contact of relay 116, outer right contact of relay 118, No. 2 terminal with which wiper 120 now engages, No. 5 contacts of relay 219, outer contacts of relay 112, wiper 223, conductor 224, wiper 324 of the final selector, terminal 325, right back contact of cut-off relay 318 of the subscriber's line to battery. If the line being tested is dead with no ground on the positive conductor and low resistance battery on the negative conductor, relay 118 will be held operated and with relay 116 deenergized a circuit will be closed from ground at the outer left back contact of relay 116, inner contacts of relay 118 to battery through the winding of relay 121. Relay 121 will then operate and at its inner front contact will extend its operating ground to operate relay 103. Relay 103 then opens the circuit of relay 219. With relay 219 released a restoring circuit is closed for switch 100 extending from battery, winding of magnet 108, No. 6 back contact of relay 227, interrupter contacts of magnet 108, outer right back contact of relay 220, No. 6 back contact of relay 219, off-normal segment 122 and cooperating wiper 102 of switch 100 to ground. Until the switch reaches normal and opens the operating circuit of magnet 108 when wiper 102 leaves the segment 122, relay 103 remains locked over its outer front contact to ground over off-normal segment 122 and wiper 102.

When relay 103 operated it also closed a circuit from ground at the middle right front contact of relay 203, middle right back contact of relay 228, No. 5 back contact of relay 227, next to outer right front contact of relay 203, wiper 229, conductor 230, winding of stepping magnet 320 of the final selector to battery. When, therefore, relay 103 releases as soon as switch 100 reaches normal, the circuit of magnet 320 is opened and the final selector advances to the next line terminal in its bank. Testing will then start as previously described on the new line.

If the line first selected, however, is a normal line connected for service then with switch 100 in position 2 relay 116 would have operated and relay 118 would have released thereby establishing the circuit of relay 104 from battery, left winding of relay 104, No. 8 contacts of relay 219, right winding of relay 104, wiper 105 and No. 2 terminal to ground at the left front contact of relay 116. As previously described relay 104 upon operating causes the advance of switch 100 into position 3.

Test of line relay feed

With switch 100 in position 3 relay 123 is connected in a loop circuit extending from battery, winding of the subscriber's line relay 326, right back contact of cut-off relay 318, terminal 325, wiper 324, conductor 224, wiper 223, retard coil 115, No. 5 contacts of relay 219, wiper 120 and the No. 3 terminal of its bank, winding of relay 123, outer left back contact of relay 109, which released when switch 100 left position 2, No. 3 terminal and wiper 117, No. 4 contacts of relay 219, retard coil 114, wiper 221, conductor 222, wiper 322, terminal 323 to ground at the inner back contact of cut-off relay 318. Relay 124 is also connected from ground over a portion of the circuit traced to ground at the back contact of cut-off relay 318. Relay 123 should operate at this time if the subscriber's line is in the proper condition to feed current to the winding of the line relay but relay 124 should not operate. Under this condition a circuit is established for relay 104 as previously traced to wiper 105, thence over the third position terminal with which it is engaged, back contact of relay 124 to ground at the front contact of relay 123. Relay 104 then advances switch 100 into position 4.

Test of free condition of sleeve wire of the subscriber's line

With switch 100 in position 4, a circuit is established for relay 125 extending from ground, right winding of relay 125, terminal 126, wiper 111, No. 3 contacts of relay 219, wiper 215, conductor 214, left front contact of relay 301, wiper 317, terminal 321, back contact of relay 326, outer left back contact of relay 318 to battery through the left winding of relay 318. Relay 125 should operate at this time and in operating closes a holding circuit for itself over its left winding and left contact, outer right back contact of relay 103, off-normal segment 122 to ground on wiper 102, and a circuit for relay 104 extending as previously traced from the windings of relay 104 to wiper 105, thence over the No. 4 terminal with which this wiper is in engagement to ground at the right contact of relay 125. Relay 104 upon operating advances switch 100 into position 5 in the manner previously described. In positions 5 to 15 inclusive direct ground is connected over wiper 111 and the circuit traced to cut-off relay 318. Relay 318 operates opening its outer left back contact to disconnect its left winding from sleeve terminal 321, thereby increasing the potential on terminal 321 to render the subscriber's line unselectable to other final selectors and opens the circuit of line relay 326 to prevent the subscriber from initiating a call.

Test to determine if line relay is disconnected

With switch 100 in position 5 a circuit is established from ground, winding of relay 124, outer left back contact of relay 109, winding of relay 123, No. 5 terminal with which wiper 120 is in engagement, wiper 120, No. 5 contacts of relay 219, retard coil 115, wiper 223, conductor 224, wiper 324 to terminal 325. If the cut-off relay 318 has operated as it should have to disconnect the winding of line relay 326, this circuit will not be completed over the right back contact of relay 318 to battery through the winding of relay 326 and therefore relays 123 and 124 will not operate and a circuit will be established for relay 104 extending as previously traced through the windings of this relay to wiper 105, then over the No. 5 terminal of its bank to ground at the back contact of relay 123. Relay 104 thereupon operates to cause the advance of switch 100 into position 6. Testing of the line insulation of the subscriber's line now commences.

Line insulation test of negative conductor to ground

The principle on which this test is based is to use the line leakage resistance as part of a potentiometer which controls the potential of the grid of thermionic valve 127.

The grid of valve 127 is now connected in parallel with resistance 128 and battery 129 over the No. 6 terminal and wiper 120 of switch 100, No. 5 contacts of relay 219, retard coil 115, wiper 223, conductor 224, wiper 324, terminal 325 to the negative or tip conductor of the line under test. The cathode of the valve is heated over a circuit including the cathode battery 130, rheostats 131 and 132 and key 133, the potential on the cathode being controlled by the rheostats. If now the leakage resistance from the negative line conductor to ground is less than a certain value the grid will be made sufficiently positive with respect to the cathode to allow enough current in the plate circuit to operate plate relay 134. The actual value of line leakage at which relay 134 operates can be varied by varying the value of resistance 128 which is of the order of 90,000 ohms or by changing the potential of the cathode or both. If, upon the test of the insulation resistance of the negative conductor, relay 134 does not operate relay 104 is operated over the circuit previously traced through its windings to wiper 105, thence over the No. 6 terminal with which this wiper is in engagement to ground at the back contact of relay 134. Switch 100 is then advanced in the manner previously described into position 7 where the same test is continued. If the condition of the negative conductor is still found to be standard switch 100 then advances into position 8 in the same manner.

Line insulation test between positive and negative line conductors

With switch 100 in position 8 the grid of the thermionic valve is again connected to the negative or tip conductor of the line under test and a direct ground is connected to the positive or ring line conductor extending from the No. 8 terminal with which wiper 117 is in engagement, wiper 117, No. 4 contacts of relay 219, retard coil 114, wiper 221, conductor 222, wiper 322, terminal 323 to the positive line conductor. If relay 134 now fails to operate indicating that the insulation between the line conductors is correct relay 104 operates over the previously traced circuit advancing switch 100 into position 9 where this test is again repeated and switch 100 is advanced into position 10.

Line insulation test of positive conductor to ground

In position 10 ground is connected over wiper 120 and the circuit previously traced to the negative line conductor and battery through resistance 135 is connected over wiper 117 and the circuit previously traced to the positive line conductor for the purpose of discharging the subscriber's ringer condenser 327 to guard against jeopardizing the next test. Switch 100 is then advanced under the control of relay 104 into position 11 in the same manner in which it was advanced into position 10. With switch 100 in position 11 ground is connected over wiper 120 to the negative conductor of the subscriber's line over the circuit previously traced and the grid of the valve 127 is connected over wiper 117 and the circuit previously traced to the positive conductor of the line. If there is no unstandard leakage to ground from the positive conductor, relay 134 will not operate and the previously traced circuit for relay 104 will be established at the back contact of relay 134 whereby relay 104 will operate to advance switch 100 into position 12. In position 12 this test is continued and switch 100 is advanced into position 13. The connection of ground to the negative line in this case does not mean that the line conductor to line conductor insulation is being tested as this condition was tested previously. In position 13 battery through low resistance 135 is connected to the positive line and direct ground to the negative line in the same manner as in position 10 to charge the ringer condenser 327 in readiness for the next test. Direct ground on the No. 13 terminal over wiper 105 which is resting thereon, operates relay 104 to advance switch 100 into position 14.

Substation ringer discharge test

With switch 100 in position 14 the grid of valve 127 and battery 129 through resistance 128 are connected over wiper 120 to the negative conductor of the subscriber's line and the positive conductor of the line is grounded over wiper 117. Thus, the subscriber's ringer condenser 327 which was fully charged in position 13 is now discharged through resistance 128. The current from the condenser discharge causes a change in the grid potential of valve 127 and the corresponding surge of space current through the winding of relay 134. Relay 134 should operate at this time and close a circuit from ground on its front contact over the No. 14 terminal and engaged wiper 136, to battery through the winding of relay 137. Relay 137 upon operating locks over its left contact, outer right back contact of relay 103, off-normal segment 122 to ground on wiper 102. At its inner right contact relay 137 closes a circuit from battery as traced through the windings of relay 104 over wiper 105 and the No. 14 terminal of its bank, to ground at the inner right contact of relay 137. Relay 104 in the manner previously described advances switch 100 into position 15. The retard coils 114 and 115, already referred to, connect the positive and negative conductors at the testing device to the testing device and serve to prevent the discharge of the ringer condenser 327 from being sufficiently violent to tinkle the ringer and also prolong the discharge thereof, thereby giving relay 134 sufficient time to operate.

In position 15 the discharge of the ringer condenser 327 is continued but in this position battery through a lower resistance 135 is connected to the negative line conductor in place of battery through the high resistance 128 and the grid of the thermionic valve 127 is not connected. The switch 100 is advanced out of position 15 into position 17 by operating relay 104 over a direct ground applied over the No. 15 and No. 16 terminals with which wiper 105 is in engagement. When switch 100 leaves position 15 the subscriber's cut-off relay 318 releases.

*Line finder of first bye-path operated to find line under test*

With switch 100 in position 17 a loop is closed from battery, winding of the subscriber's line relay 326, right back contact of relay 318, terminal 325, wiper 324, conductor 222, wiper 221, retard coil 114, No. 4 contacts of relay 219, wiper 117, No. 17 terminal with which wiper 117 is in engagement, inner left back contact of relay 109, high resistance 138, No. 17 terminal with which wiper 120 is in engagement, thence as traced to terminal 323 and ground at the inner left back contact of cut-off relay 318. Relay 326 operates in this circuit and at its right contact closes the usual line finder start circuit 328. As soon as the line finder, not shown, has seized the subscriber's line over multiple terminals 329, the cut-off relay 318 operates over the line finder sleeve terminal, left front contact of relay 326 and right winding of relay 318, relay 318 now being held operated over its right winding, outer left front contact to ground on the line finder sleeve terminal. Relay 318 also disconnects ground from the positive line conductor and the winding of line relay 326 from the negative line conductor whereupon relay 326 deenergizes.

A circuit is now established from ground on the line finder sleeve terminal, outer left front contact of relay 318, left back contact of line relay 326, terminal 321, wiper 317, left front contact of relay 301, conductor 214, wiper 215, No. 3 contacts of relay 219, wiper 111 in engagement with the No. 17 terminal of its bank, to battery through the winding of relay 109. Relay 109 operates, disconnecting resistance 138 from the loop previously traced and connecting the lower resistance winding of relay 123 therein. Relay 123 now should operate from battery in the first bye-path associated with the line finder but its resistance is such that the first bye-path is not operated off normal and no unnecessary wear is introduced into the first bye-path. If relay 123 operates indicating that the subscriber's line circuit will function correctly to initiate a call, a circuit is closed from ground at its front contact, outer right front contact of relay 137 to battery through the winding of relay 139. Relay 139 operates and closes a circuit for relay 104 extending as previously traced through the windings of relay 104 to wiper 105. No. 17 terminal with which wiper 105 is in engagement, front contact of relay 139, outer right back contact of relay 103, off-normal segment 122 to ground at wiper 102. In the manner previously described switch 100 is advanced into position 18 in which position relays 123 and 139 release.

With switch 100 in position 18 a circuit is established for relay 103 extending through its winding, the No. 18 terminal with which wiper 119 is now in engagement to ground at the No. 7 contacts of relay 219. Relay 103 upon operating locks over its outer right front contact to ground over the off-normal segment 122 and wiper 102 and opens the circuit of relay 219. Relay 219 upon releasing advances switch 100 into its normal position in the manner previously described. With switch 100 in its normal position relay 103 releases. As previously described the final selector is advanced one step to select the next subscriber's line terminating in its bank for testing.

*Line number indication*

At the time the final selector 300 was first set, the line number indicating switch 250 was standing in its home position and when relay 221 operated after the line was selected a circuit was established for the tens indicating lamp 231 from battery, lamp 231, segment 232, wiper 233 to ground at the front contact of relay 221, and a circuit was established for units indicating lamp 234 over terminal 235, wiper 236 to ground at the front contact of relay 231. Lamps 231 and 234 being lighted indicate the tens digit one and units digit one of the line under test. The thousands and hundreds digits are indicated by the position of switch 200 which selects the particular final selector having access to the line under test.

When relay 103 operated upon completion of the test on the line it closed a circuit for magnet 237 extending from battery, winding of magnet 237, left back contact of relay 228, left back contact of relay 227 to ground at the inner right front contact of relay 103 and as soon as relay 103 released upon the return of sequence switch 100 to normal, magnet 237 released to advance the wipers of switch 250 one step. In its advanced position circuits are now established for tens lamp 231 and units lamp 238 to indicate that line No. 12 is ready to be tested. It will be noted therefore that since relay 103 is instrumental in advancing both the final selector and the number indicating switch 250 that these switches advance in synchronism. When switch 250 has advanced to the last terminal set of its bank or when the test of the hundred lines accessible to the particular final selector 300 has been completed a circuit is established for relay 202, extending through the winding of relay 202, terminal 239, wiper 236 to ground at the front contact of relay 221. Relay 202 upon operating releases relay 203 in turn releasing relay 221.

Relay 202 closes a circuit from battery, winding of stepping magnet 240 of distributing switch 200, front contact of relay 202 to ground at start key 201 preparatory to advancing switch 200. Relay 221 upon de-energizing closes a circuit for magnet 237 extending from battery, winding and interrupter contacts of magnet 237, off-normal segment 241 and wiper 242 of switch 250 to ground at the back contact of relay 221 whereupon magnet 237 advances switch 250 into normal position, opening its own circuit and also opening the circuit of relay 202 which in turn releases magnet 240 to advance switch 200 one step. With switch 200 advanced a new final bye-path is seized and the testing device then functions to select an idle final selector associated with the selected bye-path and to conduct tests on the one hundred lines to which this final selector has access.

Fault alarm

When relay 219 operates at the beginning of the test of a line under test a circuit is closed from ground at interrupter 243, No. 9 contacts of relay 219, left winding of relay 244 to battery, thereby operating relay 244 as soon as the interrupter closes its back contact. Relay 244 locks over its inner right contact, left back contact of relay 104, inner left front contact of relay 219, inner right back contact of relay 220 to ground at the front contact of relay 221 and closes a circuit from battery, right winding of alarm relay 228, outer right contact of relay 244 to ground at the front contact of interrupter 243 as soon as the interrupter advances to close its front contact which is about three minutes after closing its back contact. Thus, if relay 244 remains operated for three minutes, relay 228 operates, locking over its inner left front contact and the left contact of relay 244, closing the circuit of fault lamp 246 and giving the switch 100 three minutes to advance following any particular test.

During any one of the tests made in any position of switch 100 slow releasing relay 210 operates over the left front contact of relay 104, inner left front contact of relay 219, inner right back contact of relay 220, to ground at the front contact of relay 221 and if during testing this relay releases a circuit is closed from ground over wiper 102, segment 122, No. 6 front contact of relay 219, inner back contact of relay 210, outer right back contact of relay 121 to battery through the left winding of alarm relay 228. Thus, if switch 100 is stopped for more than the releasing time of relay 210 or 300 milliseconds, alarm relay 228 will at once operate. This latter period would be too rapid for the tests made in position 1 and position 17 of switch 100, which tests are for the busy condition of the selected subscriber's line and the selection of the line by a first bye-path line finder. Therefore, in position 1 a direct circuit is established for relay 210 over the right front contact of relay 109 and in position 17 over wiper 113 to ground.

When alarm relay 228 operates a circuit is established for relay 103 extending through its winding, No. 3 back contact of relay 227, to ground at the inner right front contact of relay 228, and relay 103 in the manner previously described causes switch 100 to be advanced to normal thus releasing relay 219 in turn releasing relays 244 and 228. While relay 228 is releasing, it being slow to release, a circuit is established for relay 227 extending from battery, winding of relay 227, middle back contact of relay 121, inner left front contact of relay 103, outer left front contact of relay 228 to ground. Relay 227 operates and locks over the middle back contact of relay 121, outer left front contact of relay 227, normal contact of key 245 to ground at the start key 201. With either relay 228 or 227 operated neither the number indicating switch 250 nor final selector can be advanced and therefore when sequence switch 100 reaches normal testing will restart on the same subscriber's line.

If the fault reoccurs relay 228 will operate again but with relay 227 operated relay 228 cannot reoperate relay 103 since its circuit is opened at the inner right contacts of relay 227 but relay 228 will close the circuit of relay 220 from battery, winding of relay 220, No. 7 contacts of relay 227, No. 1 contacts of relay 219 to ground at the outer left front contact of relay 228. Relay 220 locks over its left contact, normal contacts of key 245 and contacts of start key 201 to ground. Relay 220 at its outer right front contact may close the circuit of a fault lamp 246 or other signal device that may be required. This facility for dropping off the line on the first fault indication and retesting is required to cater for the case of the subscriber instituting a call during the course of the test. In this case when the second test commences the line will be found busy and the test will be suspended until the subscriber has finished unless the conversation is unusually long when a fault is recorded. When relay 227 operated, the release of relay 219 does not cause switch 100 to return to normal under self-interruption but causes it to step in a circuit extending from battery, winding of magnet 108, No. 6 front contacts of relay 227, outer left front contacts of relay 103 to ground at interrupter 107. This introduces a sufficient delay before recommencing the test to make quite certain that the subscriber's line has been picked up by the bye-path finder and accordingly tests busy.

If the second series of tests is made without a fault indication then when switch 100 reaches position 18 a shunt is connected about the winding of relay 227 over the No. 18 terminal upon which wiper 119 is resting to ground at the No. 7 contacts of relay 219 and relay 227 releases so that the normal number of tests will be made on the next line selected for testing. When either relay 227 or 220 is operated and locks it may be released by depressing key 245. Switch 200 may, if desired, be advanced to select any final bye-path through the operation and release of key 247. Also relay 103 may be operated at any time by the depression of key 140 to advance the test sequence switch 100 to normal.

What is claimed is:

1. In a telephone exchange system, a plurality of subscribers' lines, a testing device, a selector switch associated with said testing device to select a desired one of said lines, testing means in said testing device to determine the busy or idle condition of said line, means operative by said testing means if said line is found to be idle to progressively apply a series of tests to said line, and means operated by said testing means if said line is found to be busy to cause said testing device to wait until said line becomes idle before permitting the application of said tests.

2. In a telephone exchange system, a plurality of subscriber's lines, a testing device, a selector switch associated with said testing device to select a desired one of said lines, testing means in said testing device to determine the busy or idle condition of said line, means operative by said testing means only if said line is found to be idle to progressively apply a series of tests to said line, an alarm signal, and timing means for operating said alarm signal after a predetermined interval if said line is found to be busy.

3. In a telephone exchange system, a plurality of subscribers' lines, a testing device, a selector switch associated with said testing device to select a desired one of said lines, testing means in said testing device to determine the busy or idle condition of said line, means operated by said testing means only if said line is found to be idle to progressively apply a series of tests to said line, an alarm signal and timing means for operating said alarm signal after a sufficient interval to permit the call on said line to become terminated if said line is found to be busy.

4. In a telephone exchange system, a plurality of subscribers' lines, a testing device, a selector switch associated with said testing device to select a desired one of said lines, a progression switch in said testing device for successively applying a series of tests to said line, means operative if the terminal of said selected line is idle for advancing said progression switch and means operative if said line terminal is found to be blank or not connected to a line in service to immediately restore said progression switch to normal.

5. In a telephone exchange system, a plurality of subscribers' lines, a testing device, a selector switch associated with said testing device to select a desired one of said lines, a progression switch in said testing device for successively applying a series of tests to said line, means operative if the terminal of said selected line is idle for advancing said progression switch, means operative if said line terminal is found to be blank or not connected to a line in service to immediately restore said progression switch to normal, and means for thereupon advancing said selector switch to select another subscriber's line.

6. In a telephone exchange system, a plurality of subscribers' lines, a testing device, a selector switch associated with said testing device to select lines in succession, means to progressively apply a series of tests to each line selected, means operative upon the completion of the prescribed tests of a subscriber's line to advance said selector switch to select another line, a line number indicator and means for operating said line number indicator in synchronism with said switch to indicate the number of each line selected.

7. In a telephone exchange system a plurality of subscribers' lines, a testing device, a selector switch associated with said testing device to select lines in succession, means to progressively apply a series of tests to each line selected, means operative upon the completion of the prescribed tests of a subscriber's line to advance said selector switch to select another line, a line number indicator comprising a register switch and banks of indicating lamps, and means for operating said register switch in synchronism with said selector switch to selectively light said lamps for indicating the number of each line selected.

8. In a telephone exchange system a subscriber's line, a testing device, means for associating said line with said testing device, means to progressively apply a series of tests to said line, means operative if a fault is detected on any of said tests to arrest the progression of said tests, and automatic means thereupon operative to repeat said tests.

9. In a telephone exchange system, a plurality of subscribers' lines, a testing device, a selector switch associated with said testing device to select a desired one of said lines, a progression switch in said testing device for successively applying a series of tests to said line, means operative if no fault is detected on any of said tests for restoring said progression switch and for advancing said selector switch to select another line for testing, means operative if a fault is detected to restore said progression switch without advancing said selector switch, and automatic means for thereupon advancing said progression switch to repeat said tests on the same line.

10. In a telephone exchange system, a plurality of subscribers' lines, a testing device, a selector switch associated with said testing device to select a desired one of said lines, a progression switch in said testing device for successively applying a series of tests to said line, means operative if no fault is detected on any of said tests for restoring said progression switch and for advancing said selector switch to select another line for testing, an alarm signal, means operative if a fault is detected to restore said progression switch without advancing said selector switch and to operate said alarm signal, and automatic means for thereupon advancing said progression switch to repeat said tests on the same selected line.

11. In a telephone exchange system, a plurality of subscribers' lines, a testing device, a selector switch associated with said testing device to select a desired one of said lines, a progression switch in said testing device for successively applying a series of tests to said line, means operative if no fault is detected on any of said tests for restoring said progression switch and for advancing said selector switch to select another line for testing, means operative if a fault is detected to restore said progression switch without advancing said selector switch, automatic means for thereupon advancing said progression switch to repeat said tests on the same selected line, and means operative if no fault is detected on the second tests to again restore said progression switch and to advance said selector switch to select another line for testing.

12. In a telephone exchange system, a subscriber's line having a plurality of conductors, a testing device, means for associating said testing device with the conductors of said line, a progression switch in said testing device for successively applying insulation tests to the conductors of said line, and means for automatically advancing said progression switch if the insulation of said conductors is found to be in normal or standard condition.

13. In a telephone exchange system, a subscriber's line having a plurality of conductors, a testing device, means for associating said testing device with the conductors of said line, a progression switch in said testing device for successively applying insulation tests to the conductors of said line, a thermionic valve for detecting an unstandard condition of insulation resistance on said conductors, and means controlled by said valve for arresting the advance of said progression switch if an unstandard condition of insulation resistance is detected.

14. In a telephone exchange system, a subscriber's line having a plurality of conductors, a testing device, means for associating said testing device with the conductors of said line, a progression switch in said testing device for successively applying insulation tests from each of said conductors to ground and between said conductors, a thermionic valve for detecting an unstandard condition of insulation resistance, and a relay controlled by said valve for arresting the advance of said progression switch if an unstandard condition of insulation resistance is detected.

15. In a telephone exchange system, a subscriber's line having a plurality of conductors, a testing device, means for associating said testing device with the conductors of said line, a progression switch in said testing device for successively applying insulation tests from each of said conductors to ground and between said conductors, a thermionic valve for detecting an unstandard condition of insulation resistance, a relay controlled by said valve for arresting the advance of said progression switch if an unstandard condition of insulation resistance is detected, and means controlled by said switch for discharging said line conductors between successive tests.

16. In a telephone exchange system a subscriber's line having a plurality of conductors, a testing device, a thermionic valve in said testing device, means for connecting one of said line conductors to ground and the other of said line conductors to battery through resistance and to the grid of said valve, a potentiometer comprising in part the line leakage resistance from said other line conductor to ground for controlling the potential on said grid, potentiometers for varying the potential on the cathode of said valve and means responsive to said valve if the line leakage resistance of said other conductor to ground is less than a predetermined value.

17. In a telephone exchange system, a subscriber's line having a plurality of conductors, a testing device, a thermionic valve in said testing device, a progression switch for successively connecting said line conductors to battery through resistance and to the grid of said valve, a potentiometer comprising in part the line leakage resistance from the line conductor connected to said grid from ground, potentiometers for varying the potential on the cathode of said valve, and means responsive to said valve if the line leakage resistance of the conductor under test to ground is less than a predetermined value for arresting the advance of said switch.

18. In a telephone exchange system, a subscriber's line having responsive apparatus and a plurality of line conductors, a testing device, means for associating said testing device with said line conductors and responsive apparatus, a progression switch, means controlled in the advance of said progression switch for applying a series of tests to said responsive apparatus and insulation tests to said line conductors, and automatic means for advancing said switch after each of said tests only if no unstandard condition of said responsive apparatus and conductors is detected.

In witness whereof, I hereunto subscribe my name this 24th day of June, 1931.

GEORGE CLIFFORD HARTLEY.